(12) United States Patent
Meinzinger et al.

(10) Patent No.: US 8,375,783 B2
(45) Date of Patent: Feb. 19, 2013

(54) DEVICE AND METHOD FOR DETECTING THE FILLING LEVEL OF A CONTAINER, AND DEVICE FOR FILLING A CONTAINER

(75) Inventors: Rupert Meinzinger, Kirchroth (DE); Jorg Zaschel, Muhltal (DE)

(73) Assignee: Krones AG, Neutraubling (DE)

( * ) Notice: Subject to any disclaimer, the term of this patent is extended or adjusted under 35 U.S.C. 154(b) by 291 days.

(21) Appl. No.: 12/094,892

(22) PCT Filed: Nov. 18, 2006

(86) PCT No.: PCT/EP2006/011087
§ 371 (c)(1),
(2), (4) Date: Sep. 2, 2008

(87) PCT Pub. No.: WO2007/065555
PCT Pub. Date: Jun. 14, 2007

(65) Prior Publication Data
US 2009/0126484 A1    May 21, 2009

(30) Foreign Application Priority Data
Dec. 7, 2005   (DE) .......................... 10 2005 058 616

(51) Int. Cl.
*G01G 23/00*   (2006.01)
(52) U.S. Cl. ...................................... 73/304 R
(58) Field of Classification Search ............... None
See application file for complete search history.

(56) References Cited

U.S. PATENT DOCUMENTS

| | | | | |
|---|---|---|---|---|
| 2,827,008 | A | * | 3/1958 | Hodge ..................... 73/861.53 |
| 3,678,749 | A | * | 7/1972 | Harper ..................... 73/304 R |
| 4,188,826 | A | | 2/1980 | Kankura et al. |
| 5,626,053 | A | | 5/1997 | Williamson |

FOREIGN PATENT DOCUMENTS

| | | |
|---|---|---|
| AT | 338640 B | 9/1977 |
| CA | 2115930 | 1/1994 |
| DE | 842554 | 6/1952 |
| DE | 2723999 C2 | 5/1982 |
| DE | 3838660 | 4/1989 |
| DE | 4322088 | 1/1995 |
| DE | 102005058616 | 12/2005 |
| EP | 0658511 | 11/1996 |
| EP | 0598 892 B1 | 3/1998 |
| WO | WO 9400377 | 1/1994 |

OTHER PUBLICATIONS

Written Opinion for PCT/EP2006/011087 dated Oct. 23, 2008.

* cited by examiner

*Primary Examiner* — Peter Macchiarolo
*Assistant Examiner* — Alex Devito

(57) ABSTRACT

A device and method for detecting the filling level of a container, such as a bottle, using a measuring probe that can be introduced into the container and comprises a resistance section which is electrically contacted at two points. The resistance section can be brought into contact with the product with which the container is to be filled, at different heights, the measuring probe comprising an electrically contacted reference potential electrode.

9 Claims, 1 Drawing Sheet

DEVICE AND METHOD FOR DETECTING THE FILLING LEVEL OF A CONTAINER, AND DEVICE FOR FILLING A CONTAINER

CROSS-REFERENCE TO RELATED APPLICATION

The present application claims benefit of priority of International Patent Application No. PCT/EP2006/011087, filed on Nov. 18, 2006, which application claims priority of Germany Patent Application No. 10 2005 058 616.3, filed Dec. 7, 2005. The entire text of the priority application is incorporated herein by reference in it entirety.

FIELD OF THE DISCLOSURE

The disclosure relates to a device for detecting the filling level of a container, a device for filling containers and a method for detecting the filling level of a container.

BACKGROUND

U.S. Pat. No. 4,188,826 and DE 27 23 999 C2 disclose a device for electric measurement of the level of electrically conductive fluids. An elongated electrode is immersed into the liquid there. The resistance of the electrode itself should be low with respect to the transition resistance of the electrode to the liquid. A voltage is applied to two ends of the electrode. Due to the differing heights of the potentials along the electrode in contact with the liquid, stray currents develop in the liquid. The potential of the liquid outside of the area of the stray currents corresponds to the potential of the center of the part of the electrode immersed in the liquid, with the stray currents running exactly symmetrically with the center of the immersed part of the electrode. To detect the potential outside of the area of the stray currents of the immersed electrode, the container wall, which is at a great distance, is provided. With this measurement arrangement, this yields a linear path between the measured voltage and the filling level.

EP 0 658 511 B1, DE 43 22 088 A1, AT 338640 and EP 0 598 892 B1 disclose devices for detecting the liquid levels in bottles in which electrodes can come in contact with the liquid so that the filling level can be deduced by the short circuit between the two contacts. A linear filling level measurement is difficult or impossible here, i.e., it is possible only with a great many individual resistors and corresponding contacts. However, these contact measurements have the advantage that a conductive container wall is not needed.

SUMMARY OF THE DISCLOSURE

The object of the present disclosure is to create a device and a method for detecting the filling level of a container and a device for filling containers with which the filling level of even nonconductive containers can be detected with the best possible resolution in the simplest possible and most reliable manner.

With the device for detecting the filling level, a measurement probe which can be introduced into a container and comprises a resistance segment that is electrically contacted at two locations is provided. With this resistance segment, a linear measurement method for detecting the filling level is possible.

An electrode with which a reference potential in the liquid can be detected, however, is integrated into the measurement probe itself. It has been found that even with such an arrangement in which the reference potential electrode is arranged relatively close to the resistance segment, relevant filling level measurements are possible. An electrically conductive container wall is then no longer necessary, so that even glass or plastic bottles may be used as possible containers.

To electrically insulate the reference potential electrode with respect to the resistance segment, an insulation piece is advantageously provided. It would also be conceivable to have insulation only by means of an adhesive, a gasket or the like.

An arrangement in which the reference potential electrode is arranged at the lower end of the measuring probe is especially advantageous hereby. In this area, the stray currents due to the resistance segment in the liquid are relatively minor so that a good linearity is achieved in the measurement.

The resistance segment is advantageously designed as a section of pipe. This allows an inexpensive and simple design of the resistance segment. In addition, this design of the resistance segment allows electric lines to be carried through the interior of the pipe, e.g., to the resistance segment or the reference potential electrode, and to keep them separate from the filling material in this way.

The lower end of the pipe is advantageously here sealed with an insulation piece and/or the reference potential electrode. Corresponding gaskets may also be provided advantageously here to seal the various parts with respect to one another.

An especially advantageous arrangement is one in which three lines are contacted to the resistance segment, with two lines serving to apply a d.c. voltage or a.c. voltage to the resistant segment and the third line serving to pick up a potential. Through such an arrangement, interfering influences due to stray radiation from the outside, etc. are largely eliminated.

For filling containers, a device which has a device for detecting the filling level as described above is especially advantageous.

In this method, first a measuring probe is introduced into a container and the container is then filled to an increasing extent. During this filling, the resistance segment comes increasingly in contact with the filling material. The reference potential is determined by a reference potential electrode which is immersed in the filling material and is arranged on the measurement probe.

Due to this arrangement of the reference potential electrode in the measuring probe with the resistance segment, simple handling is possible due to the fact that only one probe need be introduced into the container.

BRIEF DESCRIPTION OF THE DRAWINGS

An advantageous embodiment of the disclosure is illustrated on the basis of the accompanying figures, in which.

DETAILED DESCRIPTION

Figure 1:
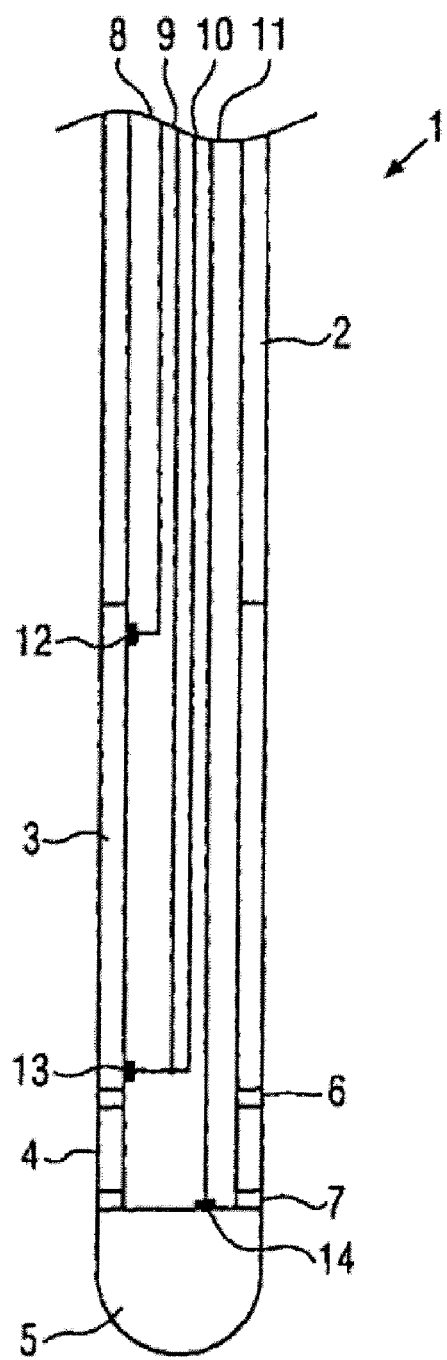
FIG. 1 shows a schematic sectional diagram through a measuring probe.

FIG. 1 shows a measuring probe 1, which is arranged on the end of a rod 2. The rod 2 may be conductive or nonconductive. At the lower end of the rod 2, a section of pipe 3 which should be electrically conductive and whose resistance should be relatively low in comparison with the contact resistance with the liquid is attached to the lower end of the rod 2. The rod 2 and the section of pipe 3 may also be formed by a pipe in one piece, whereby the section of pipe 3 is then defined by the contact 12 (see below). The section of pipe 3 is brought in contact with a contact 12 at the top and with a contact 13 at the bottom. A conductor 8 is attached to the contact 12 and two conductors 9 and 10 are attached to the contact 13. However, instead of two conductors 9 and 10, it is also possible for just a single conductor to be provided. This means that either the conductor 9 or the conductor 10 is omitted.

At the lower end of the section of pipe 3, a gasket 6 is provided, with an insulation piece 4 connected to it. The insulation piece 4 here has a length in the direction along the measurement probe amounting to between $\frac{1}{50}$ and one-half of the length of the section of pipe 3. A length in the range between $\frac{1}{5}$ and $\frac{1}{10}$ of the length of the section of pipe 3 is preferred.

A reference potential electrode 5, sealed with a gasket 7 and made of a conductive material, is provided at the lower end of the measuring probe 1. This reference potential electrode 5 is connected to a conductor 11 at a contact 14.

The various parts 2, 3, 4 and 5 may be joined to neighboring parts by means of a screw connection, for example. The gaskets 6, 7 are pressed together by screwing them together to thereby provide a tight seal.

To measure the filling level, an a.c. voltage or d.c. voltage is applied between the conductors 8 and 9. Therefore, a potential gradient develops between the contacts 12 and 13 along the section of pipe 3. Due to the fact that the resistance of the resistance segment 3 is relatively low in comparison with the transition resistance between the resistance segment 3 and the liquid surrounding it, this potential gradient is relatively independent of the filling level.

Depending on how high the filling level is along the resistance segment 3, the liquid will come in contact with parts of the resistance segment which have a different potential. Therefore, the potential of the liquid itself will change with an increase in the filling level. The potential of this liquid can be detected with the reference potential electrode 5. To do so, the voltage difference between the lines 10 and 11 can be determined or, if there is no line 10, the voltage difference between the line 9 and 11 or between the lines 8 and 11 can be determined.

With this measurement probe, a continuous determination of the filling level based on the varying voltage during the varying filling is thus possible.

Figure 2:
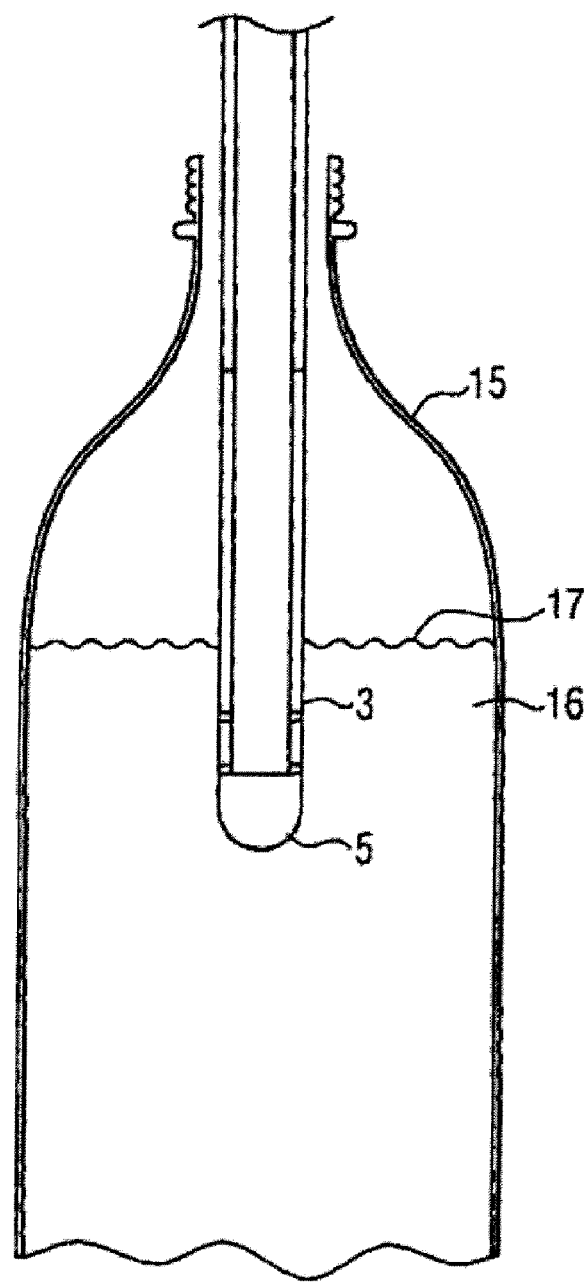
FIG. 2 shows a schematic diagram of the measuring probe in a container.

FIG. 2 illustrates an application example, in which the measurement probe 1 is immersed in a bottle 15 filled with a liquid 16. The section of pipe 3 here is partially immersed in the liquid 16. In addition, the reference potential electrode 5 is also immersed in the liquid because it is arranged beneath the lower end of the resistance segment 3.

For the sake of simplicity, FIG. 2 does not show a filling valve and/or a filling tube with which the liquid 16 is introduced into the bottle 15. The filling tube may be arranged approximately next to or concentric with the probe.

In this method, the measurement probe 1 is introduced into the bottle 15. During or before this process, the filling operation is started in which the liquid 16 is filled into the bottle 15. With an increase in the liquid level 17, the reference potential electrode 5 and then the lower end of the resistance segment 3 is contacted. In this state, the reference potential electrode 5 has the same potential as the lower end of the resistance segment 3. With a progressive rise in the liquid level 17, the potential of the liquid 16 will also change in the direction of the potential, as determined by the contact (see FIG. 1). This changing potential of the liquid can be detected with the reference potential electrode 5. As soon as the desired filling level has been reached, which can be determined by a simple voltage measurement, the filling is stopped. Then the measurement probe is removed from the container 15.

Such bottle filling may be performed, e.g., in a rotary filling machine or a linear filling machine with a plurality of filling stations (more than 5, 10, 20, 30, 40, 50, 60, 70, 80, 90 or 100).

The invention claimed is:

1. Device for detecting the filling level of a container such as a bottle, comprising a measuring probe which is introduced into the container and which has a resistance segment that is contacted electrically by a first contact and a second contact, and a longitudinal distance between the first contact and the second contact defines the resistance segment, the resistance segment being adapted to come in contact with the filling material of the container in different filling levels, and the measuring probe has a reference potential electrode that is contacted electrically, wherein the resistance segment comprises a section of pipe, and wherein the lower end of the section of pipe is sealed with one of an insulation piece, the reference potential electrode, and a combination thereof, and
   wherein the reference potential electrode and the resistance segment are arranged so that, with an increase in the filling level, the reference potential electrode and then the lower end of the resistance segment is contacted by the filling material, and
   wherein a voltage is applied to a first conductor connected to the first contact and a second conductor connected to the second contact to create a potential gradient between the first contact and the second contact such that as the filling level increases along the resistance segment, a potential of the filling material is changed, and the potential of the filling material is detected by the reference potential electrode.

2. Device according to claim 1, wherein the reference potential electrode is electrically insulated with the insulation piece with respect to the resistance segment.

3. Device according to claim 2, wherein the reference potential electrode is attached to the resistance segment with the insulation piece.

4. Device according to claim 1, wherein the reference potential electrode is arranged at the lower end of the measuring probe.

5. Device according to claim 1, and wherein electric lines are arranged in the interior of the section of pipe.

6. Device according to claim 1, and wherein gaskets are provided between the parts which can be immersed into the filling material.

7. Device according to claim 1, and an additional measurement signal line is brought in contact with the resistance segment.

8. Device for filling containers such as bottles, and a device for detecting the filling level according to claim 1.

9. Method for detecting the filling level of a container such as a bottle with a measuring probe which comprises a resistance segment that is contacted electrically by a first contact and a second contact, and a longitudinal distance between the first contact and the second contact defines the resistance segment, comprising the steps:
   introducing the measuring probe into the container,
   filling the container increasingly, so that the resistance segment comes in contact with the filling material of the container in various filling levels,
   providing an electric reference potential by a reference potential electrode that is immersed in the filling material and is arranged on the measuring probe,
   applying a voltage between a first conductor connected to the first contact and a second conductor connected to the second contact to create a potential gradient between the first contact and the second contact such that with an increase in a filling level along the resistance segment, a potential of the filling material is changed, and detecting the potential of the filling material by the reference potential electrode, wherein the resistance segment comprises a section of pipe, and wherein the lower end of the section of pipe is sealed with one of an insulation piece, the reference potential electrode, and a combination thereof, and wherein with the increase in the filling level, the reference potential electrode and then the lower end of the resistance segment is contacted by the filling material.

* * * * *